United States Patent [19]

Zinn

[11] Patent Number: 4,779,885

[45] Date of Patent: Oct. 25, 1988

[54] PIVOT JOINT ASSEMBLY FOR A FOLDING WHEELCHAIR FRAME

[75] Inventor: Eugene Zinn, West Hills, Calif.

[73] Assignee: Everest & Jennings, Inc., Camarillo, Calif.

[21] Appl. No.: 50,562

[22] Filed: May 18, 1987

[51] Int. Cl.⁴ .............................................. B62K 19/18
[52] U.S. Cl. ............................ 280/289 WC; 280/647; 297/DIG. 4; 403/191
[58] Field of Search .............. 280/242 WC, 289 WC, 280/647; 297/DIG. 4; 403/191, 234, 235, 236, 237

[56] References Cited

U.S. PATENT DOCUMENTS

| | | | |
|---|---|---|---|
| 1,380,468 | 6/1921 | Drew | 403/236 |
| 1,786,037 | 12/1930 | Sturgis | 403/191 X |
| 2,253,857 | 8/1941 | Hedstrom | 403/235 |
| 2,540,910 | 2/1951 | Reger | 403/235 X |
| 2,959,212 | 11/1960 | Bauer | 297/DIG. 4 X |
| 4,179,159 | 12/1979 | Sieklucki et al. | 297/DIG. 4 X |
| 4,436,320 | 3/1984 | Brudermann et al. | 280/242 WC |
| 4,636,104 | 1/1987 | Dihn | 403/234 X |
| 4,648,615 | 3/1987 | Volin | 280/242 WC |

Primary Examiner—John J. Love
Assistant Examiner—Charles R. Watts
Attorney, Agent, or Firm—Kelly, Bauersfeld & Lowry

[57] ABSTRACT

An improved pivot joint assembly is provided for use in the frame of a folding wheelchair or the like, wherein the pivot assembly provides a simple yet sturdy pivot interconnection between tubular frame members. The pivot joint assembly comprises a bearing of plastic or the like anchored within an open end of a first tubular frame member and defining an outwardly presented concave bearing seat, preferably of semi-cylindrical shape, for engaging the exterior of a second tubular frame member at a selected position intermediate the length of the second frame member. A strap bracket of generally U-shaped configuration is wrapped about the second frame member and secured by a lock pin or the like to the first frame member and to the bearing to retain the frame members in generally T-shaped relation with the first frame member pivotal about a central axis of the second frame member. A retainer pin is fastened through an elongated slot in the strap bracket and into the second frame member to retain the strap bracket and first frame member in a longitudinally fixed position relative to the second frame member.

15 Claims, 1 Drawing Sheet

U.S. Patent  Oct. 25, 1988  4,779,885
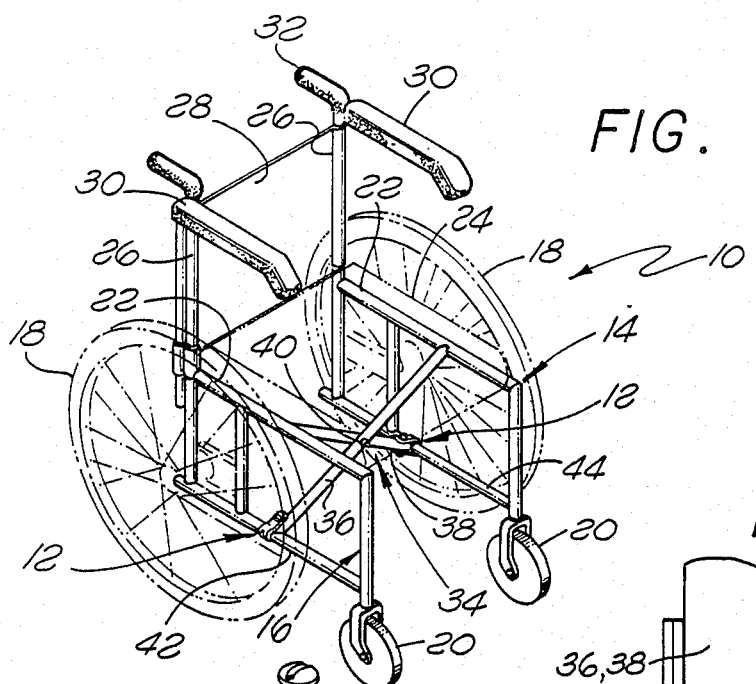
FIG. 1
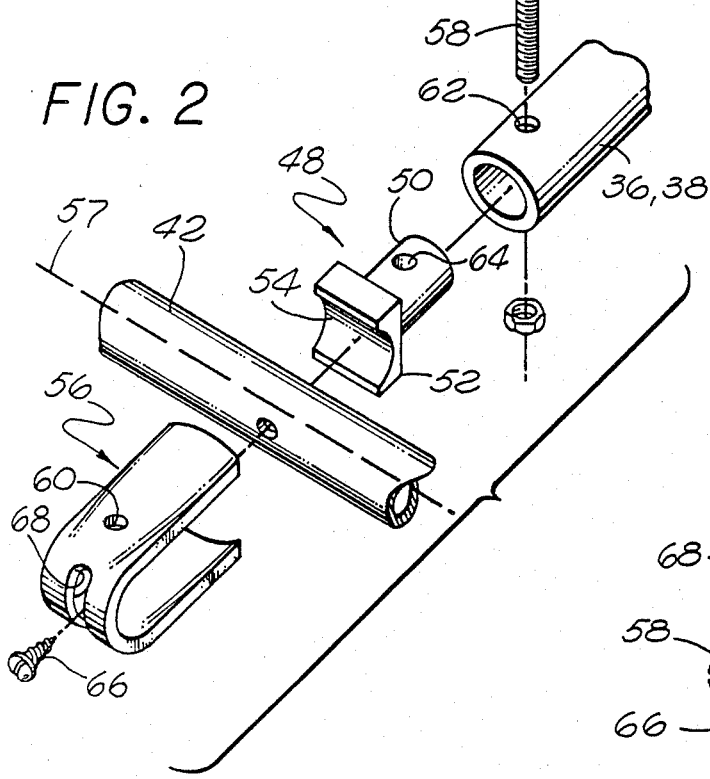
FIG. 2
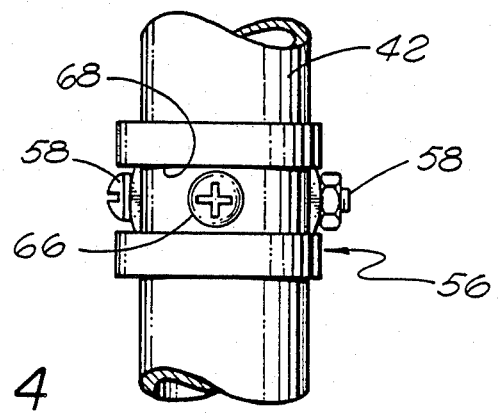
FIG. 3
FIG. 4

PIVOT JOINT ASSEMBLY FOR A FOLDING WHEELCHAIR FRAME

BACKGROUND OF THE INVENTION

This invention relates generally to improvements in folding tubular frames of the type commonly used in folding wheelchairs. More particularly, this invention relates to an improved pivot joint assembly for pivotally interconnection tubular members of a folding wheelchair frame, wherein the improved pivot assembly has a simplified and economical construction designed facilitated assembly and extended service life.

Folding wheelchair frames are well known in the art to provide a wheelchair construction adapted for folding movement between a collapsed compact configuration for shipment and storage, and an expanded configuration for normal use. Such wheelchair frames are commonly formed from metal tubing to provide lightness in weight together with relatively high structural strength, thereby providing a wheelchair which can be handled and maneuvered relatively easily yet provides a prolonged service life. However, to achieve the desired frame folding capability, movable joint structures are required to interconnect various tubular frame members, wherein these movable joint strucutres must be designed to accommodate easy frame folding over a prolonged chair life yet possess substantial structural strength to withstand the frequently large mechanical loads applied to the frame during wheelchair use. Unfortunately, these requirements have resulted in the use of complicated and costly joint structures designed to avoid mechanical failure, or, alternately, the use of compromise joint designs of reduced cost but increased likelihood of early mechanical failure.

More particularly, by way of one specific example, many folding wheelchair frames include a pair of side frames having the wheelchair wheels mounted thereon and a foldable seat and seatback connected therebetween. The two side frames are interconnected by a central cross brace of typically X-shaped configuration defined by two centrally pivoted tubular cross brace members each interconnected between tubular frame members of the two side frames. Importantly, at least one end of each cross brace member is connected in a T-shaped configuration to the adjacent side frame member by a pivot joint permitting the cross brace member to pivot or rotate about a central axis of the side frame member during folding movement of the wheelchair chair between folded and unfolded positions. In the past, this pivot joint has typically been constructed by welding the end of the cross brace member generally at a right angle to an outer pivot sleeve which is then rotatably mounted about an inner support tube connected in-line with the side frame member. While this pivot joint construction advantageously provides high structural strength for extended service life, a relatively large number of joint components and manufacturing steps are required to result in a relatively costly overall wheelchair frame construction. Moreover, it has been found that moisture can become trapped between various components of the pivot joint, particularly such as between the outer pivot sleeve and the inner support tube, resulting in undersired rust-out and failure of the pivot joint.

Accordingly, there exists a significant need for an improved pivot joint assembly for use in folding tubular frames of the type used in wheelchairs and the like, wherein the pivot joint is formed from a small number of easily assembled components adapted to provide high structural strength and easy frame folding during use. The present invention fulfills these needs and provides further related advantages.

SUMMARY OF THE INVENTION

In accordance with the invention, an improved pivot joint assembly is provided for interconnecting tubular frames members in a wheelchair frame or the like. The improved pivot joint assembly is designed for quickly and easily interconnecting the end of a first frame member in a generally perpendicular or T-shaped configuration to a second frame member, in a manner providing high structural strength while permitting easy pivoting motion of the first frame member about a central axis of the second frame member.

In a preferred form, a wheelchair frame is constructed from lightweight tubular metal frame members for folding movement between an expanded configuration for normal use and a collapsed configuration for compact shipment or strorage. A preferred frame construction includes a pair of side frames having wheelchair wheels mounted thereon and a foldable seat and seatback extending therebetween. The side frames are interconnected beneath the seat by an X-shaped cross brace having two centrally pivotally tubular cross brace members. The improved pivot joint assembly of the present invention provides pivot interconnections the cross brace members and the side frames.

More particularly, the pivot joint assembly comprises a bearing member of lightweight plastic or the like having a base for sliding reception into an open end, preferably the lower end, of the associated cross brace member. The base is formed integrally with a bearing block defining an outwardly presented concave bearing seat preferably having a semi-cylindrical configuration for seated reception of an exterior portion of a tubular frame member forming a portion of the associated side frame. This bearing seat is retained in bearing engagement with the side frame member, to provide a generally T-shaped configuration, by bracket means such as a generally U-shaped strap bracket wrapped about the side frame member and secured by a lock pin or the like to the cross brace member and the bearing base received therein. Conveniently, this strap bracket is sized for at least slight clearance relative to the side frame member to insure relatively easy pivoting motion of the cross brace member relatively to the side frame member, and to avoid rust causing accumulations of moisture between the components. Moreover, retention means such as a retention pin fastened into the side frame member within the limits of an elongated bracket slot functions to maintain the bracket and the cross brace member in a predetermined longitudinal position along the length of the side frame member.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating a folding wheelchair frame including improved the pivot joint assembly embodying the novel features of the invention;

FIG. 2 is an enlarged fragmented exploded perspective view illustrating the pivot joint assembly and components thereof;

FIG. 3 is an enlarged fragmented sectional view illustrating the assembled pivot joint; and FIG. 4 is a fragmented plan view taken generally on the line 4—4 of FIG. 3.

DETAILED DESCRIPTION OF THE PREFERRED EMBODIMENT

As shown in the exemplary drawings, a folding wheelchair frame referred to generally in FIG. 1 by the reference numeral 10 includes tubular components adapted for folding movement between an expanded configuration for normal wheelchair use and a collapsed compact configuration for facilitated transport and/or storage. The folding frame 10 includes a pair of improved pivot joint assemblies 12 formed in accordance with the invention. These improved pivot joint assemblies 12 provide relatively easily manufactured and easily assembled joint structures designed for high structural strength during normal wheelchair use while permitting easy folding and unfolding movement of the frame components, as desired.

The general construction of the illustrative wheelchair frame 10 is representative of lightweight folding wheelchair frames formed predominantly from metal tubing members. More particularly, the wheelchair frame 10 conventionally includes left and right side frames 14 and 16 each including means for supporting a relatively large main rear wheel 18 and a relatively small front caster wheel 20 which support the wheelchair for normal rolling movement. The side frames 14 and 16 include longitudinally extending upper side rails 22 having a folding seat 24 such as a sling seat or the like extending therebetween. Upper seatback posts 26 are also included at the rear of the side frames 14 and 16 to support a folding seatback 28 connected therebetween. Armrests 30 and push handles 32 are normally provided at or near the upper end of the seatback posts 26, all in a well-known manner.

A cross brace unit 34 is connected between the side frames 14 and 16 to provide a movable support structure accommodating folding movement of the side frames between the expanded and collapsed positions. More particularly, as shown in FIG. 1, the cross brace unit 34 comprises a pair of tubular cross brace members 36 and 38 centrally pivoted to each other by a suitable pivot pin 40, with each cross brace member having its opposite ends connected to the opposite side frames. Importantly, the cross brace members 36 and 38 are each associated with one of the improved pivot joint assemblies 12 incorporating the features of the invention to permit the desired folding movement of the frame 10. In particular, the cross brace unit 34 supports the side frames 14 and 16 in the expanded position with the seat 24 and seatback 28 stretched therebetween for normal wheelchair use, and a collapsed or folded position (not shown) with the side frames 14 and 16 disposed in close side-by-side relation.

More specifically, the illustrative drawings depict the cross brace member 36 with an upper end secured as by welding to a selected point along the length of the upper side rail 22 forming a portion of the left side frame 14. From this connection, the cross brace member 36 extends downwardly and transversely across the frame 10 for connection to a lower side rail 42 on the right side frame 16, by means of the pivot joint assembly 12. The other cross brace member 38 extends from an upper end connected as by welding to the upper side rail 22 on the right side frame 16 for connection by the other pivot joint assembly 12 to a lower side rail 44 on the left side frame. Alternately, if desired, the upper ends of the cross brace members 36 and 38 can be connected to the upper frame rails by alternative connection means, for example, by use of additional pivot joints of the present invention.

The improved pivot joint assembly 12 embodying the invention is shown in detail in FIGS. 2-4 with respect to pivotal connection of the cross brace member 36 to the tubular lower rail 42 of the side frame 16. However, it will be understood that the pivot joint is constructed and arranged in a similar manner for pivotal connection of alternative tubular members used in the wheelchair frame.

More specifically, as shown best in FIGS. 2 and 3, the improved pivot joint 12 assembly comprises a bearing member 48 of lightweight molded plastic or the like having a cylindrical base 50 sized for sliding reception into the open end of the cross brace member 36. The cylindrical bearing base 50 is joined, preferably as an integral molding, to a generally rectangular bearing block 52 formed with an outwardly presented concave bearing seat 54. The preferred bearing seat geometry comprises a semi-cylindrical shape with a radius of curvature chosen to correspond generally with the external configuration of the lower rail 42 whereby the bearing seat 54 matingly receives and provides a broad surface bearing engagement with the external surface of the lower rail 42.

A strap bracket 56 is provided for securing the lower rail 42 within the bearing seat 54 while permitting relatively free rotation of the cross brace member 36 about a central axis 57 of the lower rail 42. The illustrative strap bracket 56 has a generally U-shaped configuration sized to wrap about the lower rail 42 with bracket legs extending upwardly along opposite sides of the cross brace member 36. Conveniently, these bracket legs may be curvedly contoured for close conformance with the surface shape of the member 36. A lock pin 58 is fastened through aligned openings 60 in the bracket legs and further through aligned openings 62 in cross brace member 36 and an opening 64 in the bearing base 50 to secure the pivot joint components in position with respect to each other.

The longitudinal position of the pivot joint 12 is fixed relative to the lower rail 42 to prevent inadvertent and undersirable longitudinal shifting of the joint assembly along the rail. This longitudinal fixation is obtained in a relatively simple manner by means of a retention pin 66 fastened directly into the lower side rail 42 within the confines of an elongated slot 68 formed in a base portion of the strap bracket. While the retention pin 66 may take various forms, a self-tapping and self-drilling screw is preferred for ease of installation, the the screw head providing a cam within the slot to prevent longitudinal shifting of the bracket. The slot 68 is provided with sufficient length to permit up to about 40-60 degrees of rotational freedom to accommodate the necessary pivoting movement as the frame is moved between the folded and unfolded positions.

The improved pivot joint assembly is thus assembled quickly and easily from a small number of components to arrange the interconnected tubular components in generally T-shaped relation, with the cross brace member 36 being freely rotatable about the central axis of the lower rail 42. During normal use of the wheelchair, with the frame supporting the weight of the chair and/or a person seated in the chair, the compressive loading action along the length of the cross brace member 36 advantageously insures continued seating of the rail 42 in the bearing seat 54, and further maintains a slight spacing between the curved base portion of the bracket and the lower rail 42. Accordingly, little or no wear is experienced between the bracket and the rail. Moreover, a clearance can be designed between these components to avoid rust-causing moisture accumulations.

A variety of modifications and further improvements to the pivot joint assembly 12 will be apparent to those skilled in the art. Accordingly, no limitation is intended by way of the description herein and the accompanying drawings, except as set forth in the appended claims.

What is claimed is:

1. A pivot joint assembly for pivotally interconnecting first and second tubular frame members in generally T-shaped relation permitting pivoting movement of said first frame member about a central axis of said second frame member, said pivot joint assembly comprising:
   a bearing member having a base for reception into the end of said first frame member, said bearing member further including a bearing block defining an outwardly presented bearing seat;
   a generally U-shaped strap bracket carried about said second frame member and including at least one bracket leg extending along said first frame member;
   means for connecting said at least one bracket leg to said first frame member with said first and second frame members oriented generally in T-shaped relation and said bearing seat receiving and engaging an exterior portion of said second frame member; and
   means for preventing longitudinal shifting of said strap bracket along the length of said second frame member, said preventing means including an elongated slot formed in said strap bracket, and a retention pin fastened into said second frame member and having a head within said slot.

2. The pivot joint assembly of claim 1 wherein said bearing seat has a concave, generally semi-cylindrical shape sized for generally mating reception of the exterior of said second frame member.

3. The pivot joint assembly of claim 1 wherein said strap bracket includes a pair of legs extending along said first frame member.

4. The pivot joint assembly of claim 3 wherein said bracket legs are curvedly contoured to conform generally with the exterior shape of said first frame member.

5. The pivot joint assembly of claim 1 wherein said connecting means locks said bearing base within the end of said first frame member.

6. The pivot joint assembly of claim 1 wherein said first and second frame members comprise portions of a folding wheelchair frame.

7. A pivot joint assembly for interconnecting first and second frame members in generally T-shaped relation permitting pivoting movement of said first frame member generally about a central axis of said second frame member, said assembly comprising:
   a bearing member having a concave bearing seat formed therein;
   means for mounting said bearing member generally at one end of said first frame member with said bearing seat presented outwardly on said first frame member;
   bracket means mounted on said first frame member and wrapped about a sufficient portion of said second frame member for retaining an exterior portion of said second frame member intermediate the length thereof in engagement with said bearing seat; and
   retainer means for preventing longitudinal shifting of said bracket means along the length of said second frame member, said retainer means including an elongated slot formed in said bracket means and extending generally normal to the second frame member central axis, and a retainer pin fastened into said second frame member with a head thereon positioned within said slot.

8. The pivot joint assembly of claim 7 wherein said first frame member is a tubular frame member, said bearing member including a cylindrical base receivable into said one end of said first frame member, and a bearing block disposed at said one end of said first frame member, said bearing block having said seat formed therein.

9. The pivot joint assembly of claim 7 wherein said first and second frame members comprise portions of a folding wheelchair frame.

10. A pivot joint assembly in combination with a folding frame including a first tubular frame member and a second frame member, said pivot joint assembly connecting said first and second frame members in generally T-shaped relation to permit pivoting movement of said first frame member about a central axis of said second frame member, said joint assembly comprising:
   a bearing member including a generally cylindrical base for relatively close sliding reception into one end of said first frame member, and a bearing block having a generally semi-cylindrical bearing seat formed therein and presented outwardly from said one end of said first frame member, said bearing seat having a size and shape for generally mating reception of said second frame member at a position intermediate the length of said second frame member;
   a generally U-shaped strap bracket having a curved base portion and a pair of generally parallel legs, said bracket base portion having said second frame member received therein and said bracket legs lying generally alongside opposite sides of said first frame member; and
   lock means for securing said bracket legs to said first frame member, said lock means including a lock pin extending through aligned openings formed in said bracket legs, said first frame member, and said base of said bearing member.

11. The pivot joint assembly of claim 10 wherein said base portion of said strap bracket has an elongated slot formed therein, and further including a retainer pin fastened into said second frame member and having a head positioned within said slot to prevent longitudinal shifting of said strap bracket relative to said second frame member.

12. The pivot joint assembly of claim 10 wherein said base portion of said bracket is sized for slight spacing from said second frame member when said second frame is seated within said bearing seat.

13. A folding wheelchair frame comprising:

first and second side frames each including an upper side rail and a lower rail of generally tubular construction;
seat means supported between said side frames;
wheel means supported by said side frames;
a cross brace unit connected between said first and second side frames and supporting said side frame for movement between an unfolded position for normal wheelchair use and a folded position for shipment and storage, said cross brace unit including first and second tubular cross brace member centrally pivotally interconnected to each other;
said first cross brace member having an upper end connected to said upper side rail of said first side frame and a lower end connected pivotally to said lower side rail of said second side frame by a first pivot assembly, and said second cross brace member having an upper end connected to said upper side rail of said second side frame and a lower end connected pivotally to said lower side rail of said first side frame by a second pivot assembly; and each of said first and second pivot assemblies comprising a bearing member seated within the lower end of the associated cross brace member and defining a generally downwardly presented concave bearing seat, a generally U-shaped strap bracket carried about the associated lower side rail and having a pair of legs lying alongside the associated cross brace member, and a lock pin received through the associated cross brace member, the bracket legs, and the base of the bearing member.

14. The folding wheelchair frame of claim 13 wherein said strap bracket for each of said pivot joint assemblies has a size and shape for providing a slight spacing with respect to the associated second frame member when said frame is in the normal unfolded position.

15. The folding wheelchair frame of claim 13 wherein said strap bracket for each of said pivot joint assemblies has an elongated slot formed therein, and further including a retainer pin fastened into said the associated lower side rail having a head positioned within said slot to prevent longitudinal shifting of said strap bracket relative to said associated lower side rail.

* * * * *